(12) United States Patent
Park et al.

(10) Patent No.: US 9,121,977 B2
(45) Date of Patent: Sep. 1, 2015

(54) LIQUID CRYSTAL DISPLAY MODULE INCLUDING A WAVELENGTH CONVERSION MEMBER AND LIQUID CRYSTAL DISPLAY APPARATUS HAVING THE SAME

(71) Applicant: SAMSUNG ELECTRONICS CO., LTD., Suwon-si (KR)

(72) Inventors: Jae-hyun Park, Seoul (KR); Jun-seok An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 13/723,311

(22) Filed: Dec. 21, 2012

(65) Prior Publication Data

US 2013/0329161 A1    Dec. 12, 2013

(30) Foreign Application Priority Data

Jun. 12, 2012    (KR) .................. 10-2012-0062801

(51) Int. Cl.
  *G02F 1/1333*    (2006.01)
  *G02F 1/1335*    (2006.01)
  *F21V 8/00*    (2006.01)

(52) U.S. Cl.
  CPC .............. *G02B 6/0026* (2013.01); *G02B 6/009* (2013.01); *G02B 6/0023* (2013.01); *G02F 1/133615* (2013.01); *G02F 1/133621* (2013.01); *G02F 2001/133614* (2013.01); *G02F 2001/133628* (2013.01)

(58) Field of Classification Search
  USPC ................................................ 349/58, 61–65
  See application file for complete search history.

(56) References Cited

U.S. PATENT DOCUMENTS

| | | | |
|---|---|---|---|
| 8,208,094 B2 * | 6/2012 | Koganezawa | 349/69 |
| 2011/0141769 A1 * | 6/2011 | Lee et al. | 362/629 |
| 2012/0050649 A1 * | 3/2012 | Yeo | 349/65 |
| 2012/0169968 A1 * | 7/2012 | Ishimori et al. | 349/62 |
| 2013/0050612 A1 * | 2/2013 | Hur et al. | 349/62 |

FOREIGN PATENT DOCUMENTS

| | | |
|---|---|---|
| EP | 2 562 589 A1 | 2/2013 |
| JP | 2011-222665 A | 11/2011 |
| KR | 10-2009-0021912 A | 3/2009 |

OTHER PUBLICATIONS

Communication dated Sep. 20, 2013 issued by the European Patent Office in counterpart European Patent Application No. 13153741.7.

* cited by examiner

*Primary Examiner* — Huyen Ngo

(74) *Attorney, Agent, or Firm* — Sughrue Mion, PLLC

(57) ABSTRACT

A liquid crystal display module is provided including a liquid crystal panel for displaying an image; a backlight unit including a light source unit for providing light to the liquid crystal panel; and a packaging chassis which holds the liquid crystal panel and the backlight unit in a single module. The light source unit includes a plurality of light sources; a light source support board for supporting the light sources; a wavelength conversion member, disposed in front of the light sources, which converts wavelengths of light emitted from the light sources; and a fixing member which holds the wavelength conversion member in front of the light sources, defines a mounting space within which the wavelength conversion member is disposed and defines an accommodation space within which the plurality of light sources are accommodated.

19 Claims, 19 Drawing Sheets

LIQUID CRYSTAL DISPLAY MODULE INCLUDING A WAVELENGTH CONVERSION MEMBER AND LIQUID CRYSTAL DISPLAY APPARATUS HAVING THE SAME

CROSS-REFERENCE TO RELATED APPLICATIONS

This application claims priority under 35 U.S.C. §119 (a) from Korean Patent Application No. 2012-0062801 filed on Jun. 12, 2012 in the Korean Intellectual Property Office, the entire disclosure of which is incorporated herein by reference.

BACKGROUND

1. Field

Apparatuses consistent with exemplary embodiments relate to a liquid crystal display module and a liquid crystal display apparatus having the same, and more particularly, to a liquid crystal display module including a fixing member for mounting a wavelength conversion member, and a liquid crystal display apparatus having the same.

2. Description of the Related Art

A Flat Panel Display (FPD) is an image display device which is thin and light. Recently, liquid crystal displays have been the dominant FPDs on the market.

There have been various attempts to enhance the image quality of liquid crystal display devices. According to one such attempt, a wavelength conversion member, which increases color expression, is mounted to the device.

However, a method is needed for stably mounting the wavelength conversion member and solving a problem caused by the heat of the wavelength conversion member.

SUMMARY

One or more of the above-mentioned and other problems and disadvantages occurring in the conventional arrangement may be addressed by one or more exemplary embodiments. One or more exemplary embodiments may provide a liquid crystal display module for enhancing image quality displayed in a display apparatus, and a liquid crystal display apparatus having the same.

According to an aspect of an exemplary embodiment, a liquid crystal display module includes a liquid crystal panel for displaying an image; a backlight unit comprising at least one light source unit for providing light to the liquid crystal panel; and, a packaging chassis for packaging the liquid crystal panel and the backlight unit into a single module. The light source unit includes a plurality of light sources; a light source support board for supporting the light sources; a wavelength conversion member, disposed in front of the light sources, which converts wavelengths of light emitted from the light sources; and a fixing member for fixing the wavelength conversion member in front of the light sources.

The fixing member may define a mounting space within which the wavelength conversion member is mounted and an accommodation space within which the light sources are accommodated.

The light source support board may have a rectangular shape, the light sources may be arranged in a longitudinal direction of the light source support board, and the wavelength conversion member may extend in the longitudinal direction of the light source support board.

A plurality of front openings may be formed in front of the mounting space in the fixing member and a plurality of rear openings may be formed behind the mounting space in the fixing member, so that light emitted from the light sources can pass through the front openings and light emitted from the wavelength conversion member can pass through the rear openings, and the front openings and the rear openings may face each other.

The fixing member may include a first vertical part and a second vertical part; a third vertical part interposed between the first vertical part and the second vertical part; a first horizontal part connecting an upper end of the first vertical part and an upper end of the second vertical part; and a second horizontal part connecting a lower end of the first vertical part and a lower end of the third vertical part.

The mounting space may be bounded by the first vertical part, the third vertical part, the first horizontal part, and the second horizontal part, and the accommodation space may be bounded by the second vertical part, the third vertical part, and the first horizontal part.

The first vertical part may be adjacent to a front side of the wavelength conversion member, the second vertical part may be disposed behind the light sources and a lower end of the second vertical part may be supported by the light source support board, the third vertical part may be adjacent to a rear side of the wavelength conversion member, the first horizontal part may be disposed over upper ends of the light sources and the top side of the wavelength conversion member, the second horizontal part may support a bottom side of the wavelength conversion member and be supported by the light source support board, and the front openings and the rear openings may be formed in the first vertical part and the third vertical part respectively.

Ends of the wavelength conversion member may be supported by the packaging chassis.

The liquid crystal display module may further include a middle chassis for assisting the packaging chassis. The upper side of the first horizontal part may be in contact with the middle chassis.

The liquid crystal display module may further include a heat sink interposed between the packaging chassis and the light source support board.

The fixing member may further include a plurality of board contact plates extending outwards from a lower part of the first vertical part and contacting the light source support board.

The light source unit may further include a thermal conductive pad extending in the longitudinal direction of the light source support board and interposed between the second horizontal part and the light source support board.

The fixing member may include a first vertical part adjacent to a front side of the wavelength conversion member and comprising the plurality of front openings; a second vertical part disposed behind the light sources, wherein a lower end of the second vertical part is supported by the light source support board; a first horizontal part connecting to an upper end of the first vertical part and an upper end of the second vertical part; and a second horizontal part connected a lower end of the first vertical part and supported by the light source support board. The first vertical part and the second vertical part may each include a projection, wherein the projections face each other and divide the mounting space from the accommodation space, and wherein the plurality of the rear openings are defined by the projections.

The fixing member may include a first member comprising the first vertical part and the second horizontal part; and a second member comprising the first horizontal part and the second vertical part. An upper end of the first vertical part comprises an insertion part, and an insertion groove, in which the insertion part is inserted, is formed in the first horizontal part.

The fixing member may include a support part having a lower end supported by the light source support board and disposed behind the rear side of the light sources; and an elastic part extending from the upper end of the support part and securing the wavelength conversion member by pressing the wavelength conversion member such that a rear side of the wavelength conversion member is held against the front side of the light sources.

The mounting space and the accommodation space may be a single integral space defined by the fixing member.

The elastic part may include a first elastic part extending from the support part and comprising a light source support groove which extends downward and contacts upper sides of the light sources; a second elastic part extending from the first elastic part and supporting the front side and the bottom side of the wavelength conversion member; and a third elastic part extending from the second elastic part and contacting the light source support board.

The second elastic part may comprise a plurality of second elastic parts and the third elastic part may comprise a plurality of the third elastic parts, each connected to one of the plurality of second elastic parts, and each of the second elastic parts and third elastic parts may be spaced apart from a neighboring second elastic part and a neighboring third elastic part, respectively.

The fixing member may be formed of a metal.

According to an aspect of another exemplary embodiment, a liquid crystal display apparatus includes the liquid crystal display module as mentioned above.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
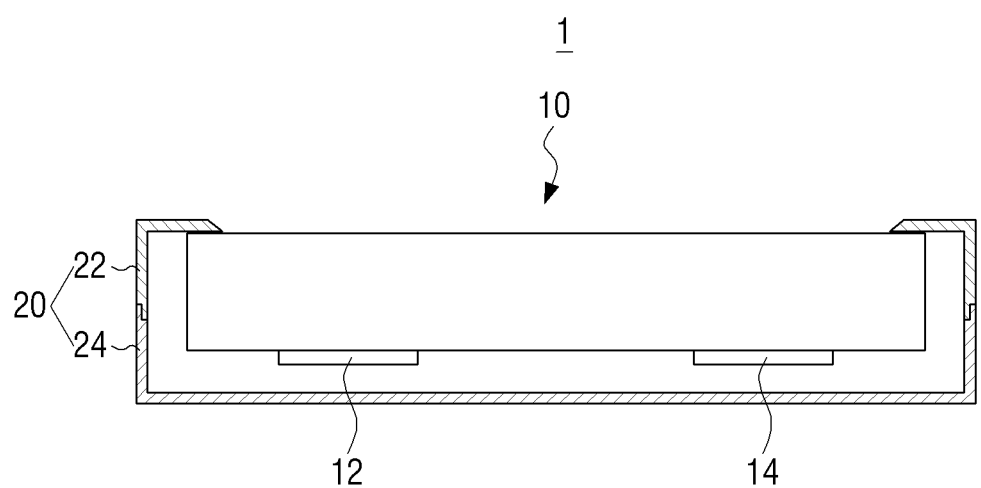
FIG. 1 is a simplified cross-sectional view of a liquid crystal display apparatus according to an exemplary embodiment.

Reference will now be made in detail to exemplary embodiments which are illustrated in the accompanying drawings, wherein like reference numerals refer to the like elements throughout.

FIG. 1 is a simplified cross-sectional view of a liquid crystal display apparatus according to an exemplary embodiments.

Referring to FIG. 1, the liquid crystal display apparatus 1 includes a liquid crystal display module 10 and a housing 20.

While the liquid crystal display apparatus 1 can may be any of various display devices such as monitor, notebook, and mobile phone, it is a television in this exemplary embodiment.

Figure 2:
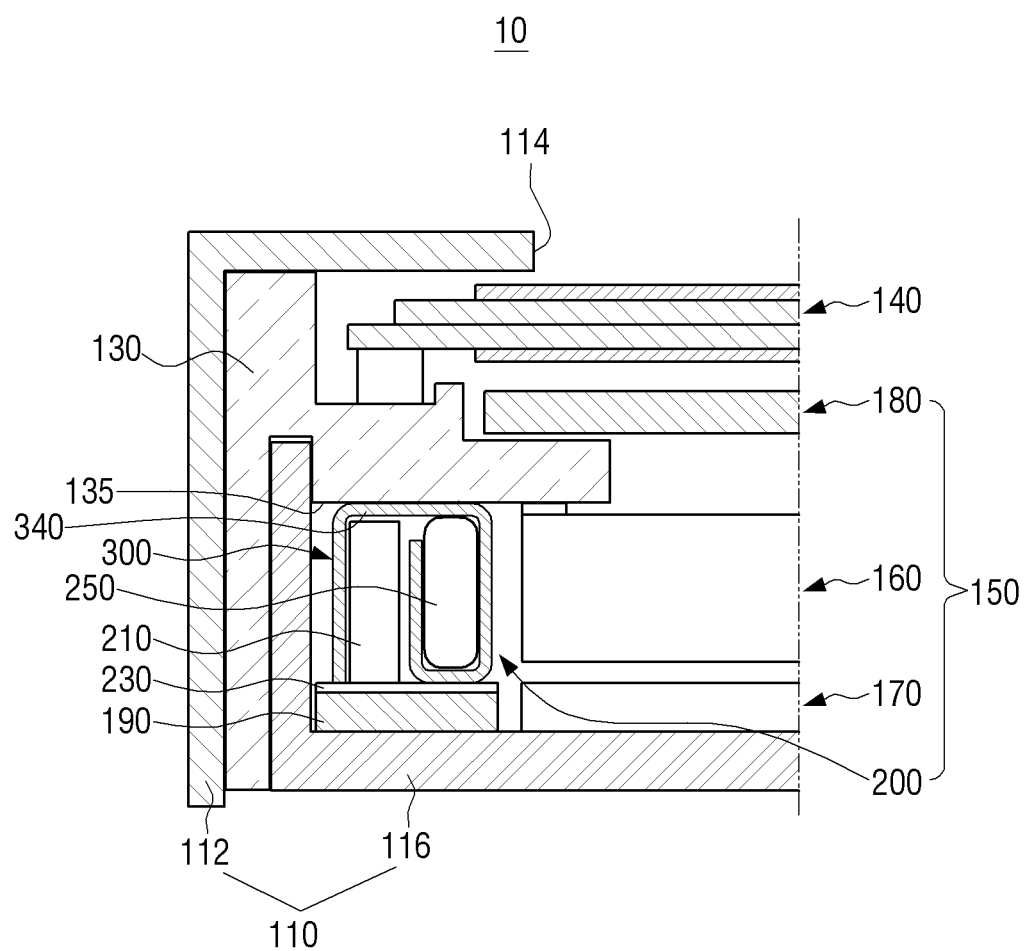
FIG. 2 is a simplified cross-sectional view of a liquid crystal display module of the liquid crystal display apparatus of FIG. 1.

The liquid crystal display module 10 displays an image to the outside, and a liquid crystal panel 140 and a backlight unit 150 are included in the liquid crystal display module 10, as shown in FIG. 2. As shown in FIG. 1, the liquid crystal display module 10 also includes a control board 12 for controlling operations of the liquid crystal display module 10, and a power board 14 for supplying power to the liquid crystal display module 10.

FIG. 2 is a simplified cross-sectional view of the liquid crystal display module of the liquid crystal display apparatus of FIG. 1.

Referring to FIG. 2, the display module 10 includes a packaging chassis 110, a middle chassis 130, a liquid crystal panel 140, a backlight unit 150, and a heat sink 190.

The packaging chassis 110 packages the liquid crystal panel 140 and the backlight unit 150 as a single module, and includes a first chassis 112 and a second chassis 116. An opening 114 is formed in the first chassis 112, and the image from the liquid crystal panel 140 is displayed to the outside through the opening 114.

The middle chassis 130 is interposed between the first chassis 112 and the second chassis 116. The middle chassis 130 assists the packaging of the display module 10, and supports components of the liquid crystal panel 140, an optical sheet part 180, and a light source unit 200. The light source unit 200 is secured such that a first horizontal part 3410 of a fixing member 300, to be explained, is supported by a rear side 135 of a protruding portion of the middle chassis 130.

The liquid crystal panel 140 displays the image, and liquid crystal (not shown) is disposed therein. The liquid crystal is driven by a voltage applied from a thin film transistor (TFT) array (not shown), and thereby the liquid crystal panel 140 displays the image. The liquid crystal panel 140 further includes a polarizing filter (not shown) and a color filter (not shown). The liquid crystal panel 140 is well known and shall be omitted here.

The backlight unit 150 provides light so that the liquid crystal panel 140 can display the image. The backlight unit 150 includes the light source unit 200, a light guide plate 160, a reflection sheet 170, and the optical sheet part 180.

The light source unit 200 supplies the light to the liquid crystal panel 140, and includes a light source 210, a light source support board 230, a wavelength conversion member 250, and the fixing member 300. The components of the light source unit 200 will be explained in detail by referring to the drawings. The light source unit 200 can be disposed on either side (as an edge type light source unit) or on a bottom/rear side (as a direct type light source unit) of the display module 10. In this embodiment, the light source unit 200 is an edge type light source unit disposed at one side of the display module 10.

The light guide plate 160 redirects the light emitted from the light source unit 200, and together with the light source unit 200, acts as a surface light source unit and projects light toward the liquid crystal panel 140. The light guide plate 160 is well known and thus is not further explained.

The reflection sheet 170 redirects light emitted from a rear surface of the light guide plate 160, opposite the liquid crystal panel 140, and reflects the light back toward the light guide plate 160. Since the reflection sheet 170 is well known, its further explanation shall be omitted.

The optical sheet part 180 may include one or more of a diffusion sheet, a prism sheet, and so on, and uniformly diffuses the light and enhances brightness. Since the optical sheet part 180 is well known, its further explanation shall be omitted.

The heat sink 190 for radiating the heat of the light source unit 200 is interposed between the light source unit 200 and the rear chassis 116. The heat sink 190 absorbs the heat radiated from the light source unit 200 and transfers the absorbed heat to the rear chassis 116. The heat sink 190 is formed of a metal material of good heat conductivity, such as aluminum or stainless steel. Since the heat sink 190 is well known, its further explanation shall be omitted.

Figure 3:
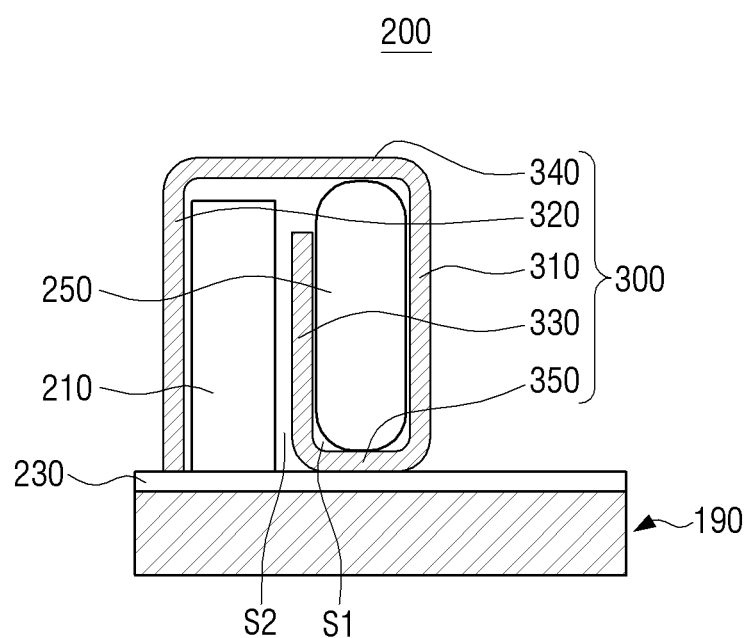
FIG. 3 is a simplified cross-sectional view of a light source unit and a heat sink of the liquid crystal display module of FIG. 2.

FIG. 3 is a simplified cross-sectional view of the light source unit and the heat sink of the liquid crystal display module of FIG. 2.

Referring to FIG. 3, the light source unit 200 includes the light source 210, the light source support board 230, the wavelength conversion member 250, and the fixing member 300 as described in FIG. 1.

Figure 8:
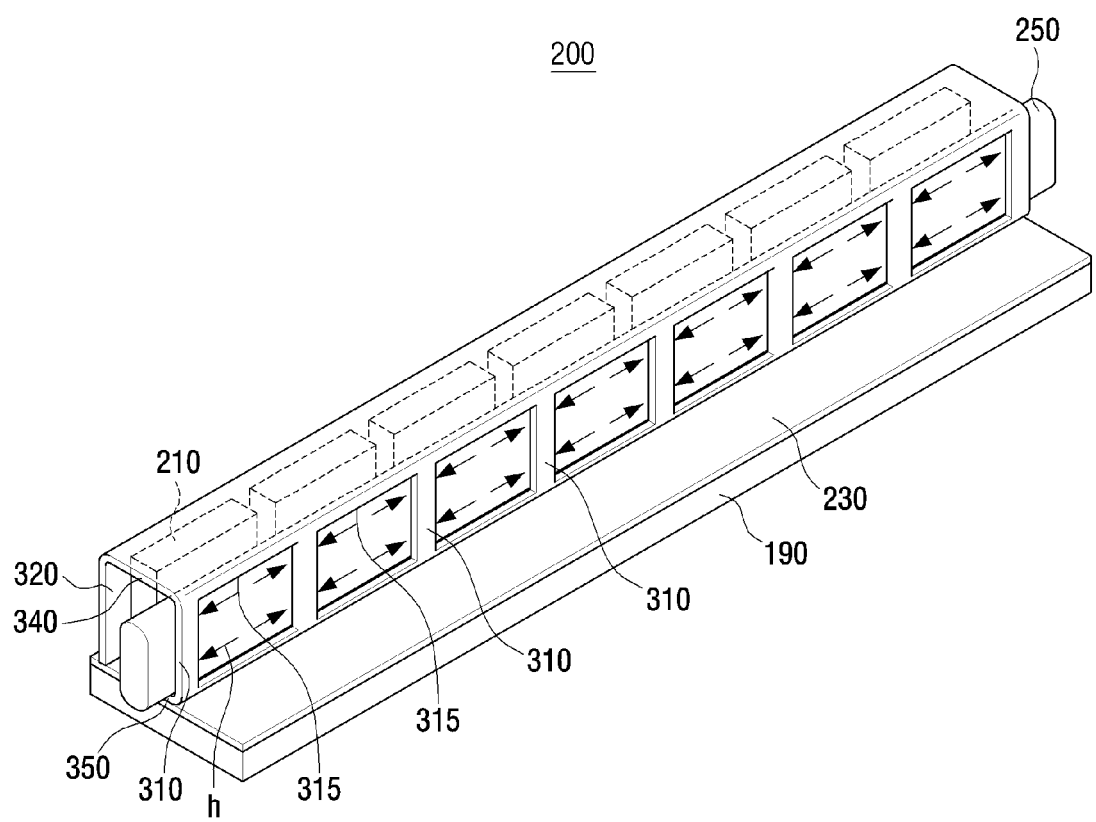
FIGS. 8 through 11 are various views of heat radiation of the light source unit of FIG. 3.

The light source 210 emits light. A plurality of the light sources 210 may be spaced a certain distance apart along a longitudinal direction of the light source support board 230 as shown in FIG. 8. The light source 210 includes a light emitting diode. The light emitting diode features a high luminous efficiency and low power consumption, and is increasingly used as a main light source of a liquid crystal display apparatus. Since the light source 210 is well known, its further explanation shall be omitted.

The light source 210 is mounted on the light source support board 230, and the light source support board 230 supports the mounted light source 210. More specifically, when the light source support board 230 is in the form of a rectangular plate as shown in FIG. 8, a plurality of the light sources 210 is mounted and supported on it. The light source support board 230 is electrically connected to the control board 12 and the power board 14, and controls the light source 210 and supplies the power to the light source 210 so that the light source 210 can emit the light.

The wavelength conversion member 250 is also mounted above an upper side of the light source support board 230, and is disposed between the light source 210 and the light guide plate 160, such that it is disposed in front of the light sources 210. The wavelength conversion member 250 extends along the longitudinal direction of the light source support board 230 to be positioned in front of the light sources 210 as shown in FIG. 8. The wavelength conversion member 250 is formed in the shape of a rectangular bar with curved upper and lower parts (rounded corners), but is not limited to this shape. The wavelength conversion member 250 may be in any other shape which may be used for easily converting the wavelength of the light from the light source 210.

The wavelength conversion member 250 can be formed of glass or plastic, and has therein a fluorescent material for converting the wavelength of the light emitted from the light sources 210. In addition to the fluorescent material, the wavelength conversion member can have other material therein.

The fixing member 300 for fixing the wavelength conversion member 250 in front of the light sources 210 is mounted on the light source support board 230. The fixing member 300 includes a mounting space S1, within which the wavelength conversion member 250 may be mounted, and an accommodation space S2, within which the light sources 210 may be accommodated.

Figure 5:
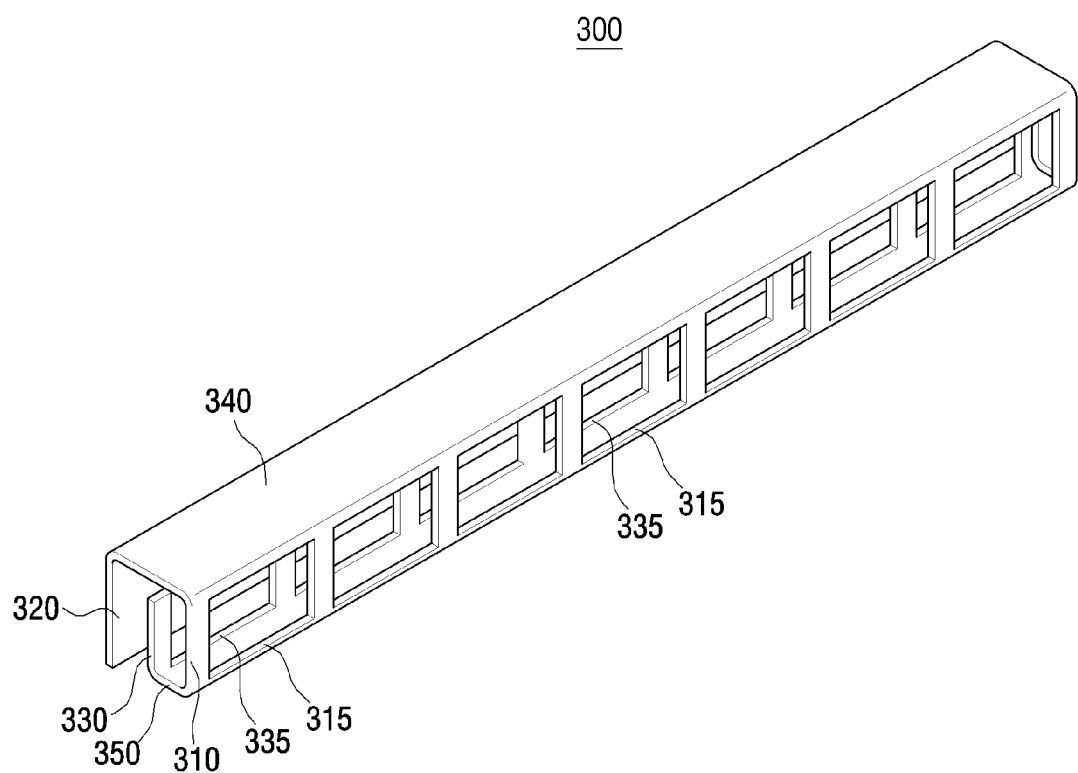
FIG. 5 is a simplified perspective view of a fixing member of the light source unit of FIG. 3.

The fixing member 300 includes a first vertical part 310, a second vertical part 320, a third vertical part 330, a first horizontal part 340, and a second horizontal part 350, which are explained in detail by referring to FIG. 5.

Figure 4:
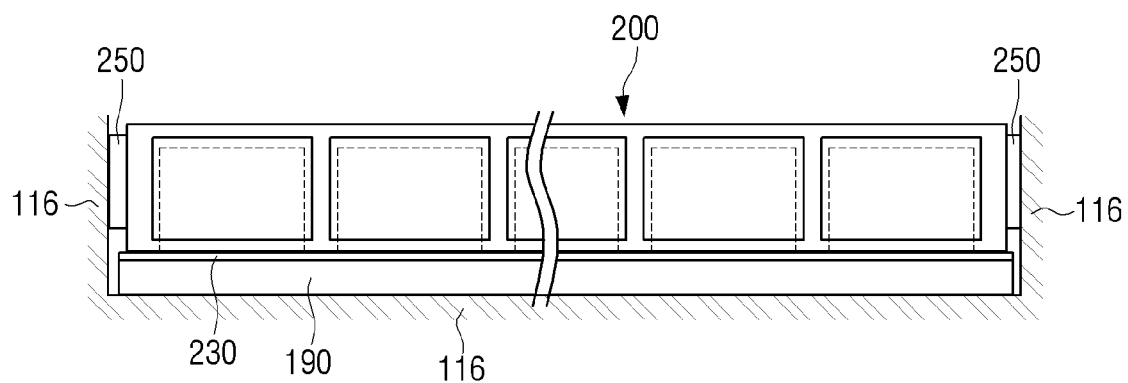
FIG. 4 is a simplified cross-sectional view of a wavelength conversion member of the light source unit of FIG. 3, which is supported by a rear chassis.

FIG. 4 is a simplified cross-sectional view of the wavelength conversion member of the light source unit of FIG. 3, which is supported by the rear chassis.

In the light source unit 200, as shown in FIG. 4, either end of the wavelength conversion member 250 is supported by the rear chassis 116. In the light source unit 200, the first horizontal part 340 of the fixing member 300 is supported by a rear bottom side 135 of a protruding portion of the middle chassis 130, and the heat sink 190 contacting the bottom side of the light source support board 230 is supported by the rear chassis 116 as shown in FIG. 2. Hence, the wavelength conversion member 250 and the fixing member 300 of the light source unit 200 can be securely fixed in the apparatus.

FIG. 5 is a simplified perspective view of the fixing member of the light source unit of FIG. 3.

Referring to FIG. 5, the fixing member 300 includes the first vertical part 310, the second vertical part 320, the third vertical part 330, the first horizontal part 340, and the second horizontal part 350 as described with respect to FIG. 3.

The first vertical part 310 is adjacent to a light output, front side of the wavelength conversion member 250, and an upper end of the first vertical part is connected to the first horizontal part 340. The first vertical part 310, the third vertical part 330, the first horizontal part 340, and the second horizontal part 350, together define the mounting space S1 within which the wavelength conversion member 250 can be mounted.

A plurality of front openings 315 are formed in the first vertical part 310. The front openings 315 are formed adjacent to and corresponding to the light emission, front side of the wavelength conversion member 250, and a number of the front openings corresponds to a number of the light sources 210. The front openings 315 are shown as having rectangular shapes, but they are not limited thereto. The front openings 315 can be formed in other shapes for adequately passing the light emitted from the light source 210 and transmitted through the wavelength conversion member 250. A length of the front opening 315 (i.e. a length in the longitudinal direction) may be similar to a length of the light source 210 in the longitudinal direction, so as to pass as much as possible of the light emitted from the light sources 210 and transmitted through the wavelength conversion member 250. The light emitted from the light source 210 passes through the wavelength conversion member 250, and is emitted to the outside of the light source unit 200 through the front opening 315s, and then is incident on the light guide plate 160.

An upper end of the second vertical part 320 is connected to the first horizontal part 340, and a lower end of the second vertical part 320 is supported by the light source support board 230. The second vertical part 320 is disposed adjacent to a rear side of the light sources 210. The second vertical part 320, the first horizontal part 340, and the third vertical part 330, together form the accommodation space S2 within which the light sources 210 may be accommodated.

The third vertical part 330 supports the rear side of the wavelength conversion member 250, is interposed between the first vertical part 310 and the second vertical part 320 and between the light sources 210 and the wavelength conversion member 250, and is adjacent to the front side of the light sources 210. The third vertical part 330 spatially separates the mounting space S1 and the accommodation space S2.

Rear openings 335 are formed in the third vertical part 330 at locations corresponding to the front openings 315. The rear openings 335 have rectangular shapes, like the front openings 315, but are not limited thereto. The rear openings 335 can be formed in other shapes for adequately passing the light emitted from the light sources 210. Similar to the front openings 315, a number of the rear openings 335 corresponds to the number of light sources 210, and are in positions corresponding to the positions of the front openings 315. The light emitted by the light sources 210 is transmitted to the wavelength conversion member 250 via the rear openings 335.

The first horizontal part 340 covers the top part of the light sources 210 and supports the top side of the wavelength conversion member 250. The second horizontal part 350 supports the bottom side of the wavelength conversion member 250, and the bottom side is supported by the top side of the light source support board 230.

The first through third vertical parts 310, 320 and 330 and the first and second horizontal parts 340 and 350 are formed through a bending process. That is, the fixing member 300 is fabricated by bending one member multiple times. The front openings 315 and the rear openings 335 are fabricated using cutting or punching.

Figure 6:
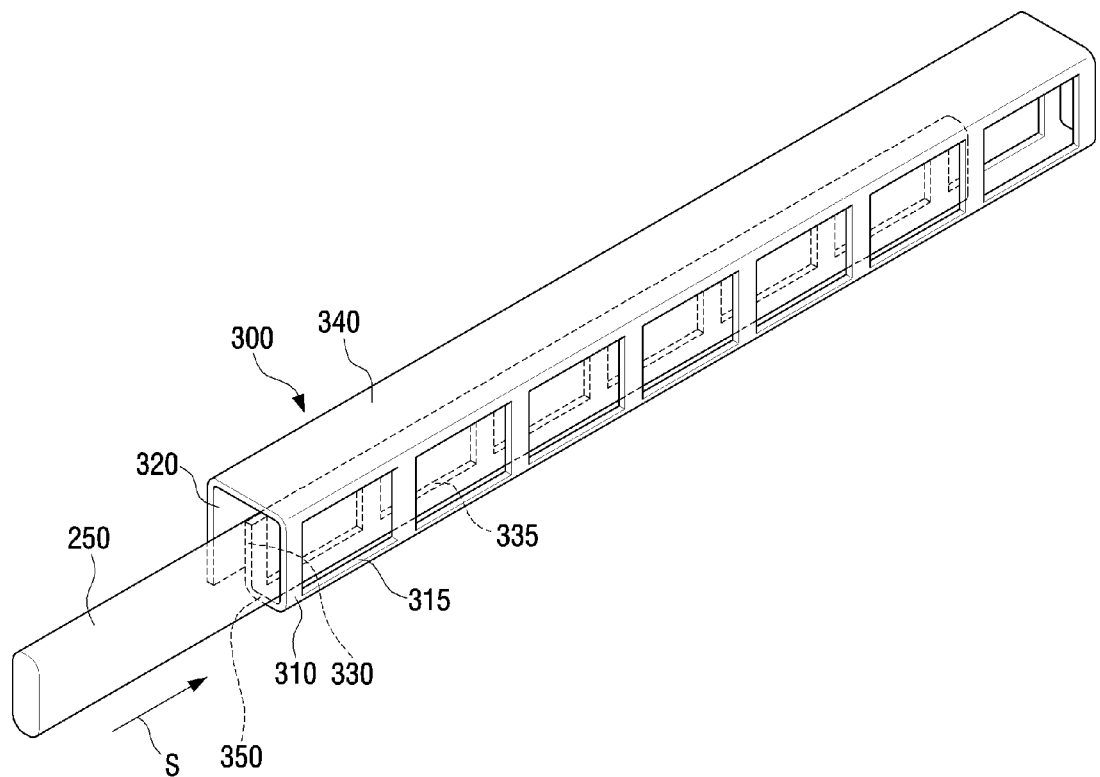
FIGS. 6 and 7 are simplified views of the wavelength conversion member of FIG. 3 mounted.
Figure 7:
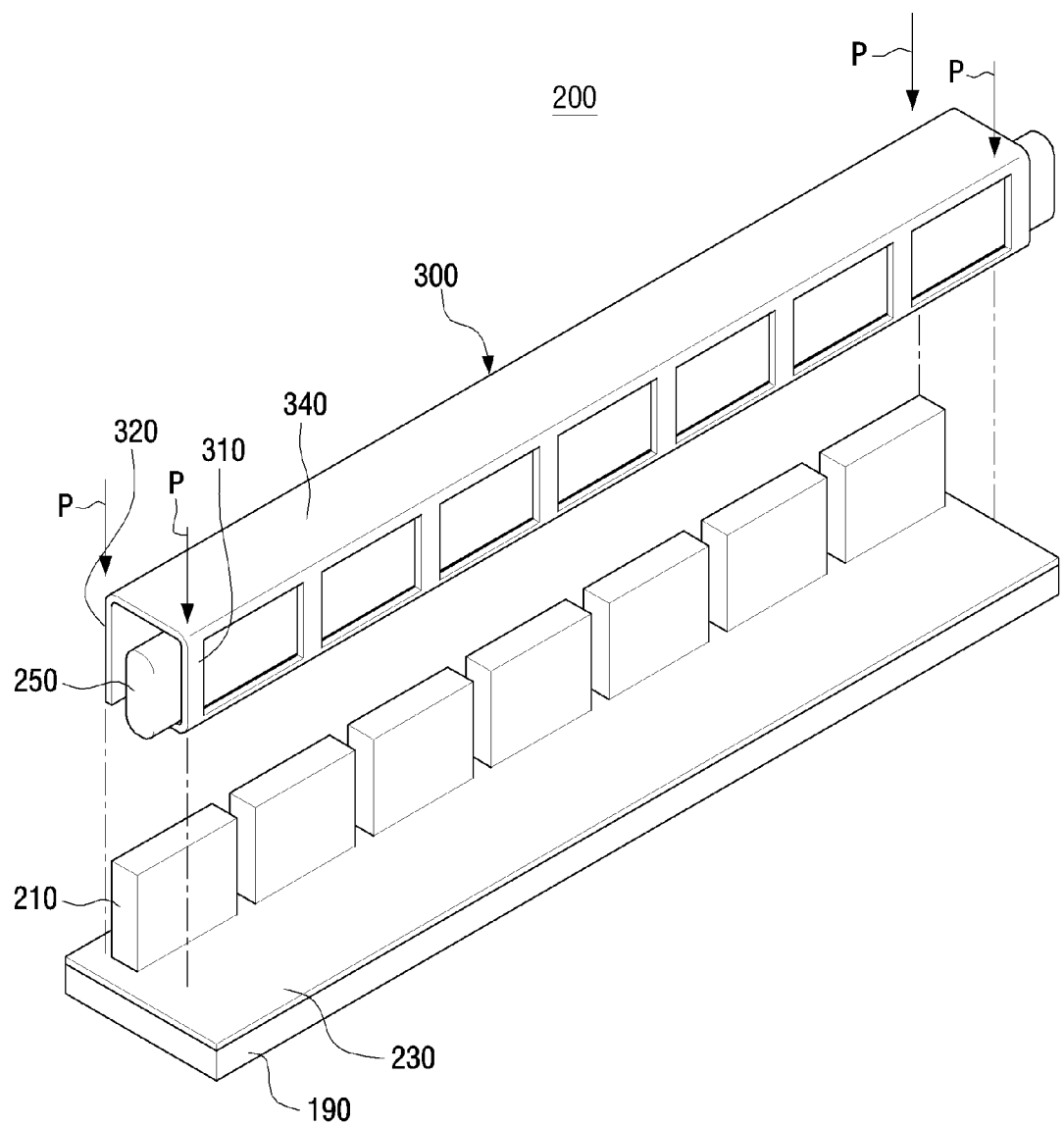

FIGS. 6 and 7 are simplified views of the wavelength conversion member of FIG. 3, as it is mounted.

Referring to FIG. 6, the wavelength conversion member 250 is mounted by sliding it from one side along an arrow S, as shown in FIG. 6, into the mounting space S1 which is formed by the first vertical part 310, the third vertical part 330, the first horizontal part 340, and the second horizontal part 350 of the fixing member 300.

Referring to FIG. 7, once the wavelength conversion member 250 is mounted in the fixing member 300, the fixing member 300 moved onto the light source support board 230 along an arrow P so that the plurality of light sources 210 are received within the accommodation space S2 which is formed by the second vertical part 320 and the first horizontal part 340.

When the fixing member 300 is mounted onto the light source support board 230, the wavelength conversion member 250 and the fixing member 300 are supported and securely fixed to the rear chassis 116 and the middle chassis 130 as discussed with respect to FIG. 3. In this embodiment, the wavelength conversion member 250 can be securely mounted to the light source unit 200 using the fixing member 300 without a separate fastening component such as screw or tape.

FIGS. 8 through 11 depict various embodiments for heat radiation from the light source unit.

Like the light sources 210, the wavelength conversion member 250 radiates heat which results from the heat absorbed from the light sources 210 and the heat radiated by the wavelength conversion. The fixing member 300 is formed of a metal having a good heat conductivity so as to absorb the heat radiated by the wavelength conversion member 250 and to transfer the absorbed heat to the heat sink 190. That is, the fixing member 300 can be formed of a metal such as aluminum or stainless steel, similar to that of the heat sink 190.

Referring to FIG. 8 the heat R radiated from the wavelength conversion member 250 is guided between the front openings 315 of the first vertical part 310. That is, since the plurality of the front openings 315, rather than the single front opening 315, is formed, the first vertical part 310 can absorb the heat radiated from the wavelength conversion member 250 between the front openings 315. This also applies to the third vertical part 330, which is not depicted in the drawing. The heat radiated from the wavelength conversion member 250 is also transferred to and absorbed by the other components of the fixing member 300, that is, the first horizontal part 340, the second horizontal part 350, and the second vertical part 320. Since either end of the wavelength conversion member 250 is supported by the rear chassis 116, as shown in FIG. 3, the heat may also be transferred directly to the rear chassis 116.

The fixing member 300 absorbs the heat radiated from the wavelength conversion member 250 and transfers the heat to the heat sink 190, and the heat sink 190 transfers the heat to the rear chassis 116, shown in FIG. 2. The fixing member 300 also absorbs the heat radiated from the light source 210 and transfers it to the heat sink 190. As a result, the fixing member 300 can radiate heat not only from the wavelength conversion member 250 but also from the light sources 210, can thereby assist the heat sink 190.

Figure 9:
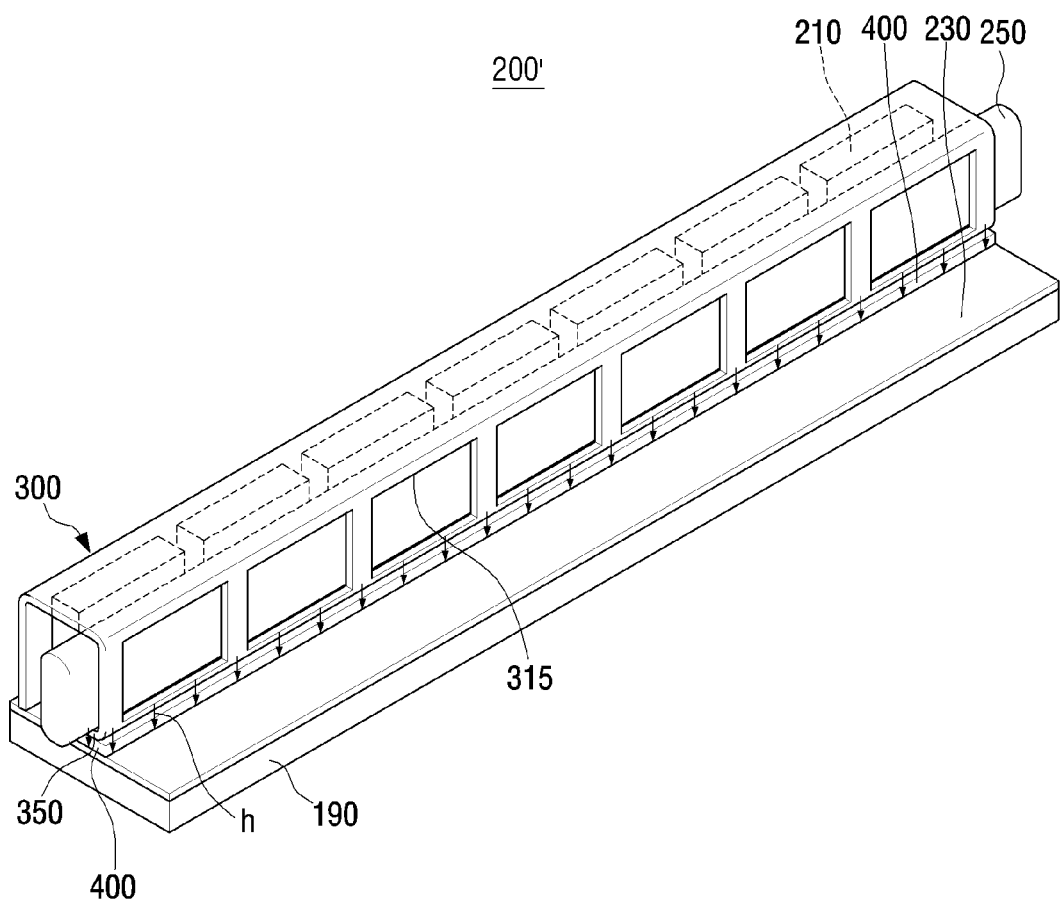
Figure 10:
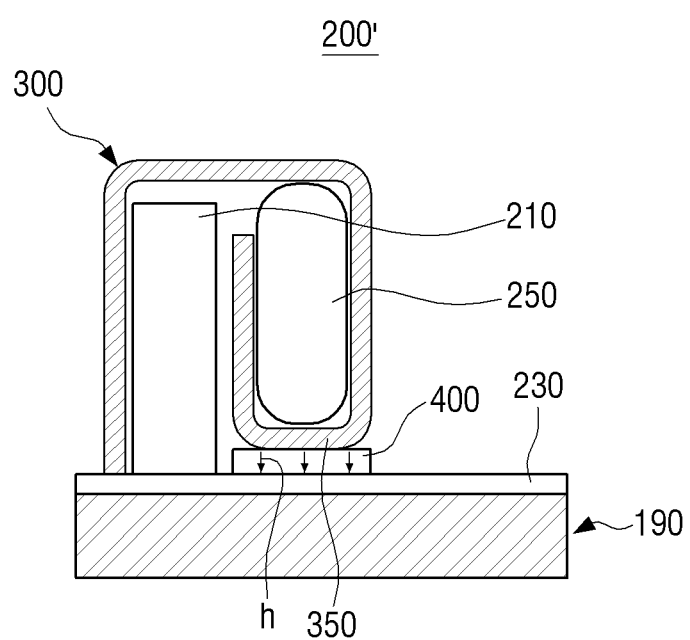

Referring to FIGS. 9 and 10, a light source unit 200' may further include a thermal conductive pad 400 in addition to the components of the aforementioned light source unit 200.

The thermal conductive pad 400 extends in the longitudinal direction of the light source support board 230 and lies between the light source support board 230 and the second horizontal part 350 of the fixing member 300. The thermal conductive pad 400 absorbs the heat h from the second horizontal part 350 and transfers the absorbed heat h to the heat sink 190.

The thermal conductive pad 400 is in a rectangular shape, but is not limited thereto. In some cases, the thermal conductive pad 400 may be formed of a film. The thermal conductive pad 400 can be formed of graphite having a good thermal conductivity, or another material having a good thermal conductivity.

Since the thermal conductive pad 400 assists in absorbing and transferring the heat of the lower part of the fixing member 300, the heat radiation efficiency of the wavelength conversion member 250 can be further increased thereby.

Figure 11:
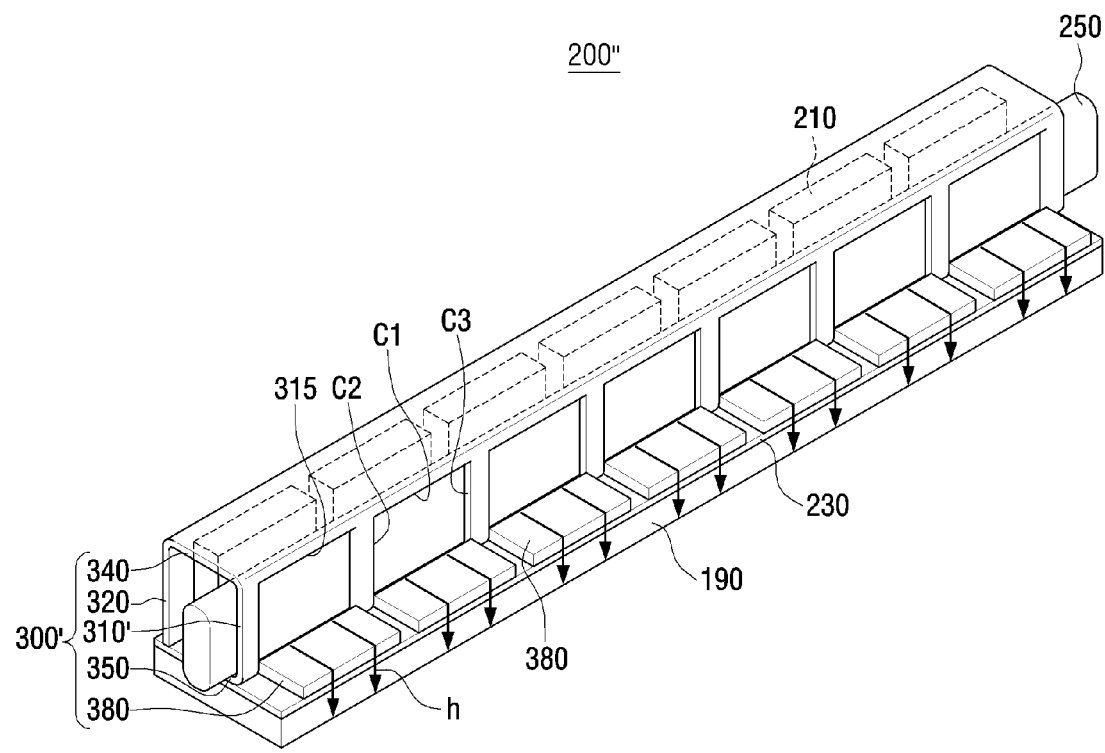

Referring to FIG. 11, a light source unit 200' includes a fixing member 300' which further includes a board contact plate 380 in addition to the components of the light source unit 200.

A plurality of board contact plates 380 are formed by extending outwards portions of the fixing member 300' (in a width direction of the light source support board 230) from the lower parts of the front openings 315 of the first vertical part 310. That is, a number of the board contact plates 380 corresponds to a number of the front openings 315.

The board contact plates 380 are formed together with the front openings 315 when the front openings 315 are formed in the first vertical part 310'. To fabricate one board contact plate 380, three cuts C1 through C3 are made to form the front opening 315 in the first vertical part 310. A part of the first vertical part 310 inside the three cuts C1 through C3 is bent downwards from the first vertical part 310. Thus, the portions bent downwards form the single board contact plates 380.

The board contact plate 380 has a rectangular shape, and contacts the top side of the light source support board 230. Similar to the second horizontal part 350, the board contact plate 380 absorbs the heat h radiated from the wavelength conversion member 250 and transfers the absorbed heat to the heat sink 190.

Since the fixing member 300' can extend the contact surface area of the light source support board 230 by adding the board contact plate 380 to the lower end of the second vertical part 320 and the second horizontal part 350, the heat h radiated from the wavelength conversion member 250 can be more effectively transferred to the heat sink 190.

Figure 12:
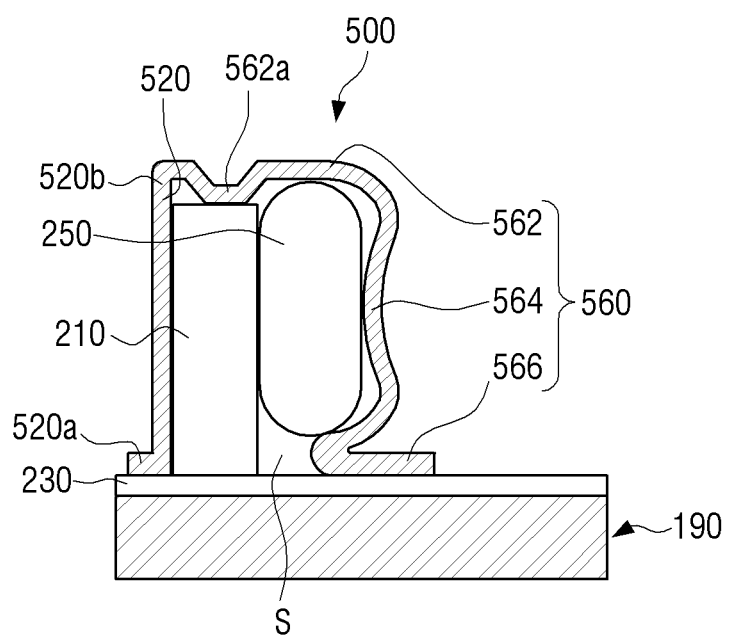
FIG. 12 is a simplified cross-sectional view of a light source unit and a heat sink according to another exemplary embodiment.
Figure 13:
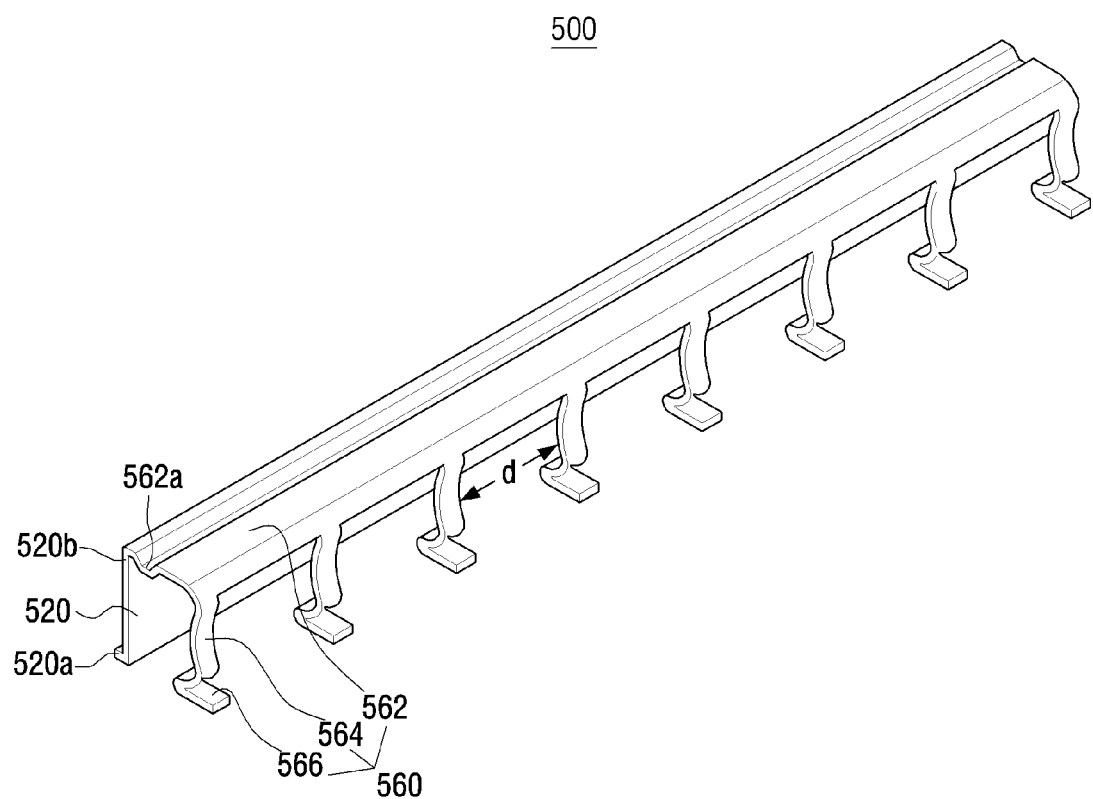
FIG. 13 is a simplified perspective view of a fixing member of the light source unit of FIG. 12.

FIG. 12 is a simplified cross-sectional view of a light source unit and a heat sink according to another exemplary embodiment, and FIG. 13 is a simplified perspective view of a fixing member of the light source unit of FIG. 12.

Referring to FIG. 12, the light source unit 200A further includes a fixing member 500 in addition to the light source unit 210, the light source support board 230, and the wavelength conversion member 250, as described above.

In the present embodiment, unlike in the previously-described exemplary embodiment, the mounting space for mounting the wavelength conversion member 250 and the accommodation space for accommodating the light sources 210 are integrated into a single space S in the fixing member 500. The fixing member 500 is formed of a metal having a good elasticity, and elastically secures the wavelength conversion member 250.

Referring to FIG. 13, the fixing member 500 includes a support part 520 and an elastic part 560.

The support part 520 supports the rear sides of the light sources 210, and a lower end 520a of the support part 520 is supported by the top side of the light source support board 230. The lower end 520a of the support part 520 is bent to be parallel with the light source support board 230 and thus contacts the light source support board 230.

The elastic part 560 includes a first elastic part 562, a second elastic part 564, and a third elastic part 566.

The elastic part 560 extends from the support part 520 and brings the rear side of the wavelength conversion member 250 into contact with the front side of the light sources 210 to secure the wavelength conversion member 250 inside the fixing member 500.

The first elastic part 562 extends from the upper end 520b of the support part 520 and is adjacent to the top side of the wavelength conversion member 250. A light source support groove 562a is formed in the first elastic part and is bent toward the light source support board 230 and extends in the longitudinal direction of the light source support board 230. The light source support groove 562a contacts the top side of the light sources 210.

The second elastic part 564 extends downward from the first elastic part 562 and supports the front side and the bottom side of the wavelength conversion member 250. The portion of the second elastic part 564 facing the center of the front of the wavelength conversion member 250 is concave toward the wavelength conversion member 250, so the second elastic part 564 elastically contacts the center of the front of the wavelength conversion member 250.

A plurality of second elastic parts 564 are formed and spaced a certain distance d apart from each other in the longitudinal direction of the first elastic part 562. The distance d between the second elastic parts 564 is set such that the light passing through the wavelength conversion member 250 properly passes through the fixing member 500. That is, in this embodiment, the space between the second elastic parts 564 serves as the front opening 315 of the previously-described embodiment. Accordingly, the distance d between the second elastic parts 564 may be approximately the length of one of the light sources 210 (in the longitudinal direction).

The third elastic part 566 extends from a bottom end of the second elastic part 654, and extends in parallel with the light source support board 230. A plurality of the third elastic parts 566 is formed, and a number of the third elastic parts 566 is the same as the number of the second elastic parts 564. The third elastic part 566 contacts the light source support board 230 and assists the elastic contact between the second elastic part 564 and the wavelength conversion member 250. The third elastic part 566 increases the contact surface area of between light source support board 230 and the wavelength conversion member 250 to facilitate the heat transfer to the heat sink 190.

Figure 14:
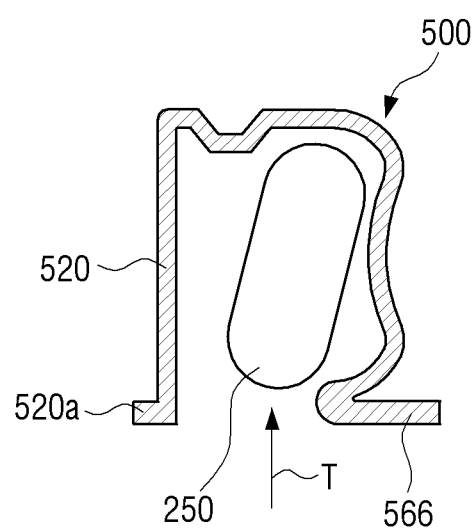
FIGS. 14 through 16 are simplified views of the wavelength conversion member of FIG. 12 mounted.
Figure 15:
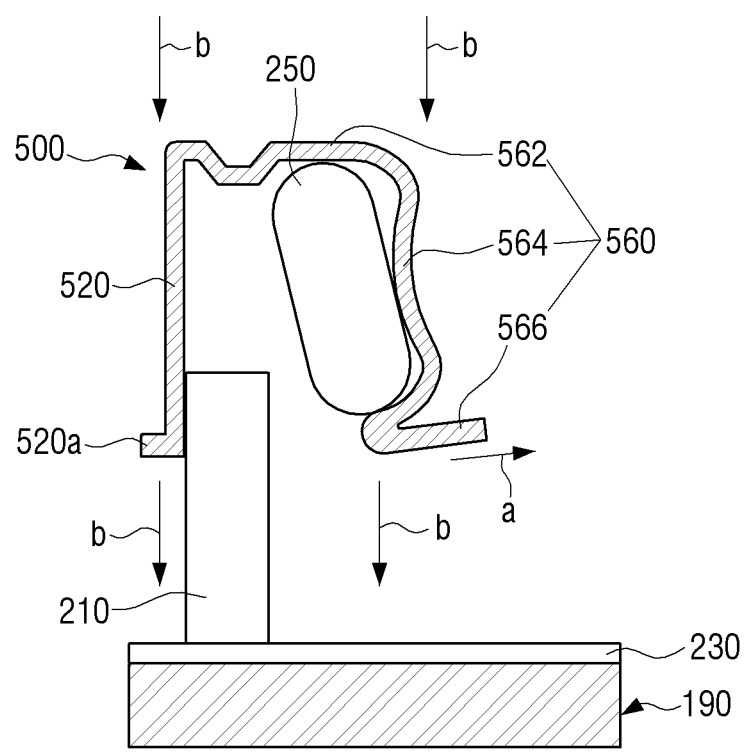
Figure 16:
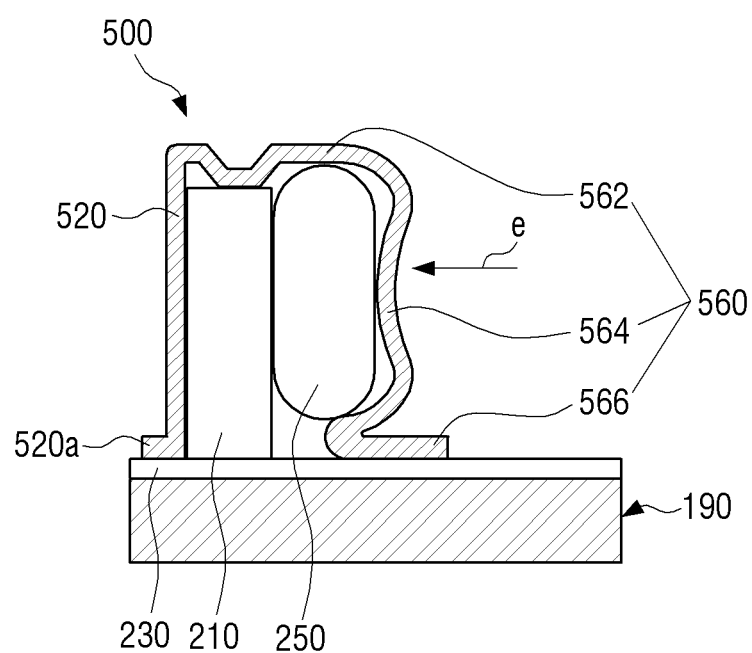

FIGS. 14 through 16 are simplified views of the wavelength conversion member of FIG. 12, as mounted.

Referring to FIG. 14, the wavelength conversion member 250 is inserted upwards into the fixing member 500, along an arrow T, through the space between the lower end 520a of the support part 520 and the third elastic part 566 of the fixing member 500.

Referring to FIG. 15, once the wavelength conversion member 250 is inserted into the fixing member 500, the elastic part 560, in particular, the second elastic part 564 and the third elastic part 566 are pulled outwards, and away from each other, so as to increase a distance between the lower end 520a of the support part 520 and the third elastic part 566. Next, the fixing member 500 is put down in the direction b so as to accommodate the light sources 210 therewithin.

Referring to FIG. 16, once the light sources 210 and the wavelength conversion member 250 are within the fixing member 500, the elastic part 560 applies a restoring force in a direction e. Hence, the second elastic part 564 contacts the center of the front of the wavelength conversion member 250 and pushes the wavelength conversion member 250 toward the light sources 210. As a result, the rear side of the wavelength conversion member 250 closely contacts the front side of the light sources 210, the rear side of the light sources 210 closely contacts the inner side of the support part 520, and the wavelength conversion member 250 and the light sources 210 are securely fixed in the fixing member 500.

In this embodiment, the light sources 210 and the wavelength conversion member 250 are made to contact each other by means of the fixing member 500. Hence, the efficiency of the incident light to the wavelength conversion member 250 can be increased.

Figure 17:
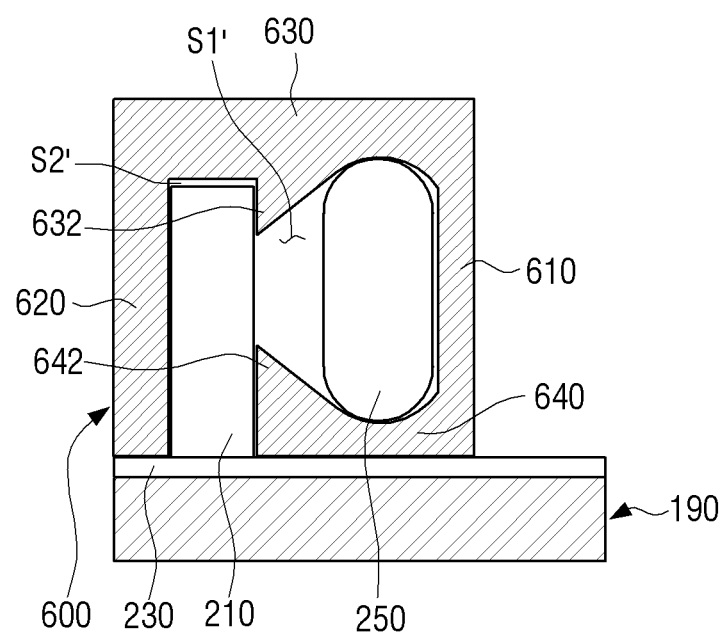
FIG. 17 is a simplified cross-sectional view of a light source unit and a heat sink according to yet another exemplary embodiment.

FIG. 17 is a simplified cross-sectional view of a light source unit and a heat sink according to yet another exemplary embodiment.

Referring to FIG. 17, the light source unit 200B further includes a fixing member 600 in addition to the light source 210, the light source support board 230, and the wavelength conversion member 250, as described above.

The fixing member 600 may be integrally formed by injection molding, and includes a first vertical part 610, a second vertical part 620, a first horizontal part 630, and a second horizontal part 640.

The first vertical part 610 supports the front side of the wavelength conversion member 250, and includes a plurality of front openings (not shown) in the front side. The second vertical part 620 is disposed behind the light sources 210 and a lower end of the second vertical part 620 is supported by the light source support board 230.

The first horizontal part 630 connects the top end of the first vertical part 610 and the top end of the second vertical part 620. The first horizontal part 630 covers the upper part of the light sources 210 and supports the top side of the wavelength conversion member 250.

The second horizontal part 640 is connected to the lower end of the first vertical part 610 and is supported by the light source support board 230. The second horizontal part 640 is spaced apart from the second vertical part 620 by a distance corresponding to the thickness of the light source 210, so as to accommodate the light sources 210 therebetween.

Projections 632 and 642 extend from the first horizontal part 630 and the second horizontal part 640, respectively, and face each other, and form a mounting space S1' and an accommodation space S2'. The projections 632 and 642 are spaced apart to enable the light emitted from the light sources 210 to be transmitted to the wavelength conversion member, thus serving as the rear openings, as described with respect to the previous exemplary embodiment.

Figure 18:
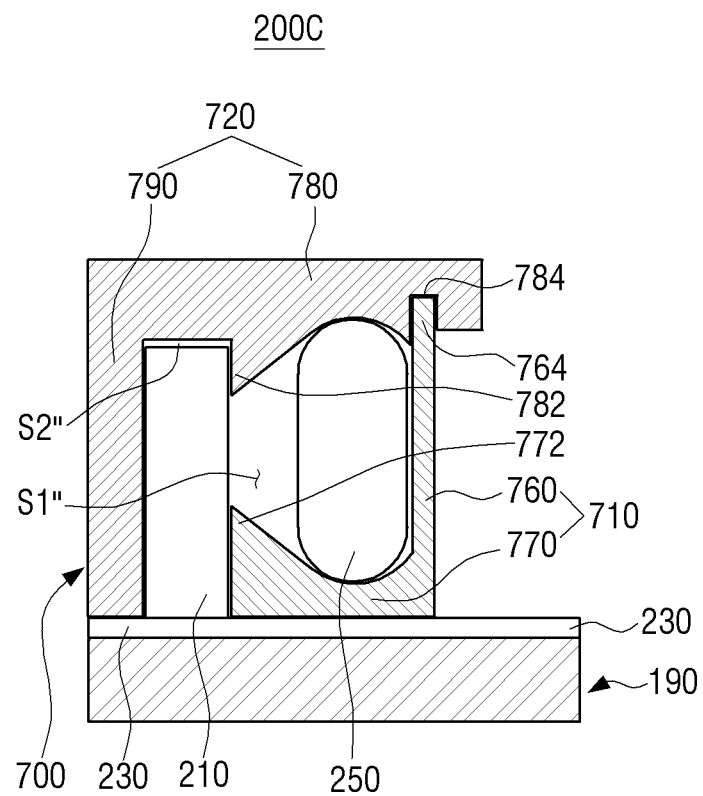
FIG. 18 is a simplified cross-sectional view of a light source unit and a heat sink according to still another exemplary embodiment.
Figure 19:
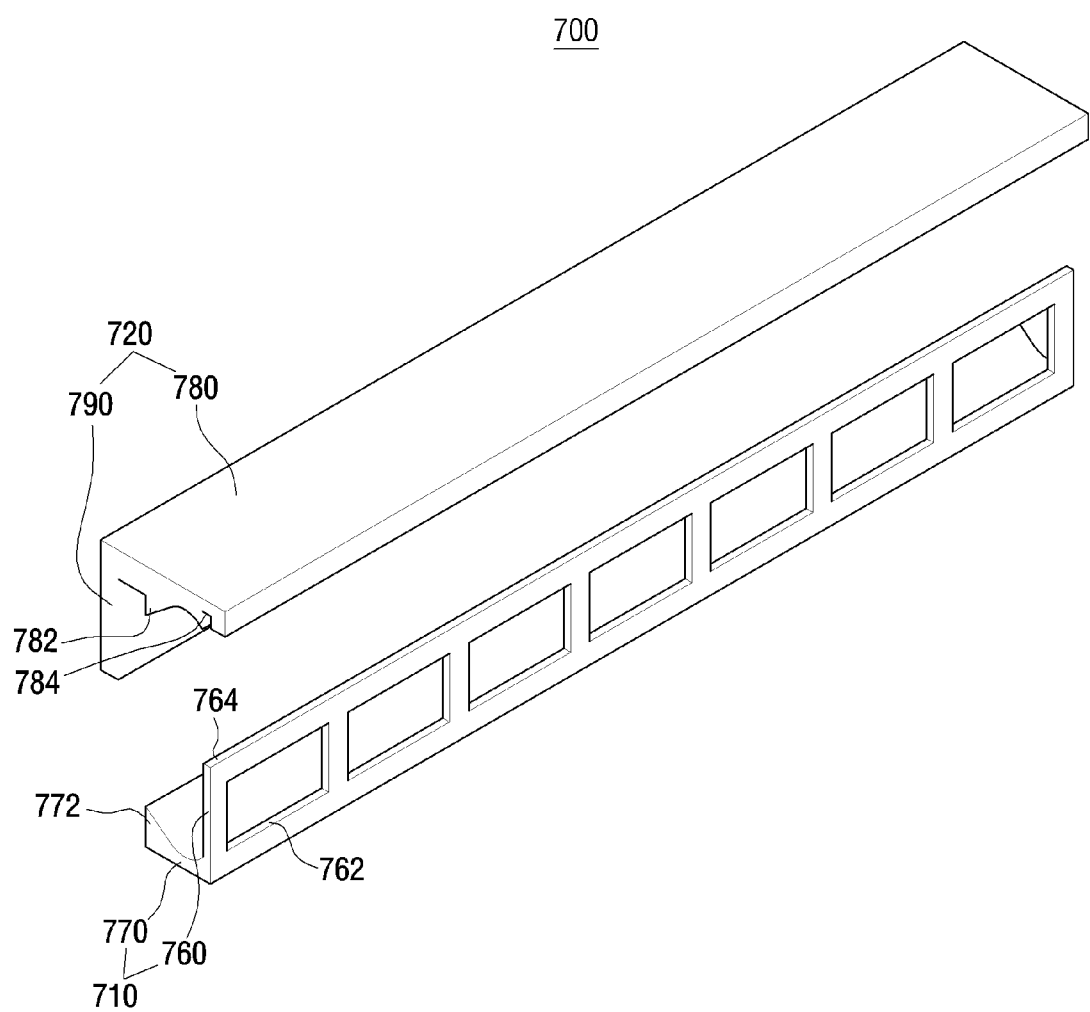
FIG. 19 is a simplified exploded perspective view of a fixing member of the light source unit of FIG. 18.

FIG. 18 is a simplified cross-sectional view of a light source unit and a heat sink according to still another exemplary embodiment, and FIG. 19 is a simplified exploded perspective view of a fixing member of the light source unit of FIG. 18.

Referring to FIGS. 18 and 19, the light source unit 200C further includes a fixing member 700 in addition to the light source 210, the light source support board 230, and the wavelength conversion member 250, as described above.

The fixing member 700 includes a first member 710 and a second member 720.

The first member 710 includes a first vertical part 760 and a second horizontal part 770.

The first vertical part 760 is adjacent to and supports the front side of the wavelength conversion member 250. A plurality of front openings 762 is formed and spaced a certain distance apart from each other in the longitudinal direction of the fixing member 700 in the first vertical part 760. The first vertical part 760 includes an insertion part 764 in the upper end thereof, to connect to the second member 720.

The second horizontal part 770 is substantially similar to the second horizontal part 640 of the exemplary embodiment of FIG. 17. The second horizontal part 770 includes a projection 772 as in the second horizontal part 640 of the exemplary embodiment of FIG. 17.

The second member 720 includes a first horizontal part 780 and a second vertical part 790.

The first horizontal part 780 covers the top side of the light sources 210 and supports the top side of the wavelength conversion member 250. The first horizontal part 780 includes a projection 780 at a location facing the projection 772 of the second horizontal part 770. The projections 772 and 782 separate a mounting space S1" and an accommodation space S2" as in the exemplary embodiment of FIG. 17, and may serve as the rear opening.

An insertion groove 784 for inserting the insertion part 764 of the first vertical part 760 is formed in the lower front side of the first horizontal part 780. The first member 710 and the second member 720 are coupled using the insertion groove 784 of the first horizontal part 780 and the insertion part 764 of the first vertical part 760.

The second vertical part 790 is substantially similar to the second vertical part 620 of the exemplary embodiment of FIG. 17. The second vertical part 790 is disposed behind the light sources 210 and a lower end of the second vertical part 790 is supported by the light source support board 230.

Unlike the previously-described embodiments, the fixing member 700 of this exemplary embodiment includes two members 710 and 720. Since the first member 710 and the second member 720 are coupled through the insertion, a separate fastening component, such as screw or tape, for fixing the fixing member is not required. Thus, the fixing member 700 of this exemplary embodiment can be mounted in the display apparatus simply and stably.

Although a few exemplary embodiments have been shown and described, it would be appreciated by those skilled in the art that changes may be made in these embodiments without departing from the principles and spirit of the inventive concept, the scope of which is defined by the claims and their equivalents.

What is claimed is:

1. A liquid crystal display module comprising:
   a liquid crystal panel which displays an image;
   a backlight unit comprising a light source unit which provides light to the liquid crystal panel; and
   a packaging chassis holding the liquid crystal panel and the backlight unit,
   wherein the light source unit comprises:
   a plurality of light sources;
   a light source support board on which the light sources are supported;
   a wavelength conversion member disposed in front of the light sources, wherein the wavelength conversion member converts wavelengths of the light emitted from the plurality of light sources; and
   a fixing member which holds the wavelength conversion member in front of the light sources,
   wherein the fixing member defines a mounting space within which the wavelength conversion member is disposed,
   wherein the fixing member comprises a plurality of front openings formed in the fixing member in front of the mounting space and a plurality of rear openings formed in the fixing member behind the mounting space, such that light emitted from the light sources passes through the rear openings, and light emitted from the wavelength conversion member passes through the front openings, and
   positions of the front openings correspond to positions of the rear openings, such that the front openings and the rear openings face each.

2. The liquid crystal display module of claim 1, wherein the fixing member defines an accommodation space within which the plurality of light sources are accommodated.

3. The liquid crystal display module of claim 2, wherein:
   the light source support board has a rectangular shape,
   the plurality of light sources are arranged along a longitudinal direction of the light source support board, and
   the wavelength conversion member extends in the longitudinal direction of the light source support board.

4. The liquid crystal display module of claim 3, wherein first and second ends of the wavelength conversion member are supported by the packaging chassis.

5. The liquid crystal display module of claim 2, wherein the fixing member comprises:
   a support part adjacent to a rear side of the plurality of light sources, wherein a lower end of the support part is supported by the light source support board; and
   an elastic part which extends extending from an upper end of the support part and which secures the wavelength conversion member by pressing the a front side of the wavelength conversion member such that a rear side of the wavelength conversion member contacts the front side of the light sources; and
   wherein the fixing member defines a space within which the plurality of light sources and the wavelength conversion member are disposed.

6. The liquid crystal display module of claim 5, wherein the elastic part comprises:

a first elastic part which extends from the upper end of the support part and which comprises a light source support groove which contacts an upper side of the plurality of light sources;

a second elastic part which extends from the first elastic part and which supports the front side and a bottom side of the wavelength conversion member; and a third elastic part which extends from the second elastic part and which contacts the light source support board.

7. The liquid crystal display module of claim 6, wherein:
the second elastic part comprises a plurality of the second elastic parts and the third elastic part comprises a plurality of the third elastic parts, wherein each of the plurality of the third elastic parts is connected to a corresponding one of the plurality of second elastic parts, and
each of the second elastic parts and the third elastic parts are respectively spaced apart from a neighboring second elastic part and a neighboring third elastic part.

8. The liquid crystal display module of claim 1, wherein the fixing member comprises:
a first vertical part, a second vertical part, and a third vertical part disposed between the first vertical part and the second vertical part;
a first horizontal part connecting an upper end of the first vertical part and an upper end of the second vertical part; and
a second horizontal part connecting a lower end of the first vertical part and a lower end of the third vertical part.

9. The liquid crystal display module of claim 8, wherein:
the mounting space is bounded by the first vertical part, the third vertical part, the first horizontal part, and the second horizontal part, and
the accommodation space bounded by the second vertical part, the third vertical part, and the first horizontal part.

10. The liquid crystal display module of claim 8, wherein:
the first vertical part is adjacent to a front side of the wavelength conversion member,
the second vertical part is disposed behind the light sources and a lower end of the second vertical part is supported by the light source support board,
the third vertical part is adjacent to a rear side of the wavelength conversion member,
the first horizontal part is disposed above the light sources and the wavelength conversion member,
the second horizontal part supports a bottom side of the wavelength conversion member and is supported by the light source support board, and
the front openings are formed in the first vertical part and the rear openings are formed in the third vertical part.

11. The liquid crystal display module of claim 8, further comprising:
a middle chassis,
wherein an upper side of the first horizontal part contacts the middle chassis.

12. The liquid crystal display module of claim 8, further comprising:
a heat sink interposed between the packaging chassis and the light source support board.

13. The liquid crystal display module of claim 12, wherein the fixing member further comprises:
a plurality of board contact plates which extend outwards from the lower end of the first vertical part and which contact the light source support board.

14. The liquid crystal display module of claim 12, wherein the light source unit further comprises:

a thermal conductive pad extending in the longitudinal direction of the light source support board and interposed between the second horizontal part and the light source support board.

15. The liquid crystal display module of claim 1, wherein the fixing member comprises:
a first vertical part disposed in front of a front side of the wavelength conversion member, wherein the plurality of front openings are formed in the first vertical part;
a second vertical part disposed behind the light sources, wherein a lower end of the second vertical part is supported by the light source support board;
a first horizontal part connected to an upper end of the first vertical part and an upper end of the second vertical part; and
a second horizontal part connected a lower end of the first vertical part and supported by the light source support board,
wherein the first horizontal part comprises a first projection extending downwards and the second horizontal part comprises a second projection extending upwards, such that the first projection and the second projection face each other and separate the mounting space from the accommodation space and wherein the plurality of the rear openings are bounded by the first projection and the second projection.

16. The liquid crystal display module of claim 15, wherein the fixing member further comprises:
a first member comprising the first vertical part and the second horizontal part; and
a second member comprising the first horizontal part and the second vertical part,
wherein the first horizontal part comprises an insertion groove, and an upper end of the first vertical part comprises an insertion part which is inserted into the insertion groove.

17. The liquid crystal display module of claim 1, wherein the fixing member is formed of a metal.

18. A liquid crystal display apparatus comprising a liquid crystal display module, wherein the liquid crystal display module comprises:
a liquid crystal panel which displays an image;
a backlight unit comprising a light source unit which provides light to the liquid crystal panel; and
a packaging chassis holding the liquid crystal panel and the backlight unit,
wherein the light source unit comprises:
a plurality of light sources;
a light source support board on which the light sources are supported;
a wavelength conversion member disposed in front of the light sources, wherein the wavelength conversion member converts wavelengths of the light emitted from the plurality of light sources; and
a fixing member which holds the wavelength conversion member in front of the light sources,
wherein the fixing member defines a mounting space within which the wavelength conversion member is disposed,
wherein the fixing member comprises a plurality of front openings formed in the fixing member in front of the mounting space and a plurality of rear openings formed in the fixing member behind the mounting space, such that light emitted from the light sources passes through the rear openings, and light emitted from the wavelength conversion member passes through the front openings, and positions of the front openings correspond to positions of the rear openings, such that the front openings and the rear openings face each.

19. A backlight unit for a display module, the backlight unit comprising:
   a light guide plate and a light source unit which emits light to the light guide plate;
   wherein the light source unit comprises:
      a plurality of light sources;
      a light source support board on which the light sources are supported;
      a wavelength conversion member disposed in front of the light sources, wherein the wavelength conversion member converts wavelengths of the light emitted from the plurality of light sources; and
      a fixing member which holds the wavelength conversion member in front of the light sources,
      wherein the fixing member defines a mounting space within which the wavelength conversion member is disposed,
      wherein the fixing member comprises a plurality of front openings formed in the fixing member in front of the mounting space and a plurality of rear openings formed in the fixing member behind the mounting space, such that light emitted from the light sources passes through the rear openings, and light emitted from the wavelength conversion member passes through the front openings, and
      positions of the front openings correspond to positions of the rear openings, such that the front openings and the rear openings face each.

* * * * *